United States Patent Office 2,786,860
Patented Mar. 26, 1957

2,786,860

PREPARATION OF ORGANIC ALUMINUM COMPOUNDS

Karl Ziegler, Hans-Georg Gellert, and Heinz Martin, Mulheim an der Ruhr, Germany; said Gellert and said Martin assignors to said Ziegler No Drawing. Application May 12, 1953,
Serial No. 354,624

Claims priority, application Germany May 13, 1952

16 Claims. (Cl. 260—448)

This invention relates to improvements in the preparation of organic aluminum compounds.

Various processes are known for the preparation of organic compounds of aluminum, i. e. compounds which contain an aluminum atom in direct combination with a carbon atom of an organic radical. These processes may be summarized as follows:

1. The reaction of metallic aluminum with mercury alkyls.
2. The reaction of organic halogen compounds with aluminum or aluminum-magnesium alloys.
   a. This reaction is, for example, for the production of aluminum trimethyl proceeds as follows:

First, a mixture of aluminum methyl dichloride and aluminum dimethyl chloride is formed from the reaction of aluminum with methyl chloride which proceeds as follows:

$$2Al + 3ClCH_3 \rightarrow AlCl_2CH_3 + AlCl(CH_3)_2$$

This mixture of aluminum methyl dichloride and aluminum dimethyl chloride is known as "methyl aluminum sesquichloride." The methyl aluminum sesquichloride is then converted with sodium metal into aluminum trimethyl:

$$3(CH_3)_2AlCl + 3Na = 3NaCl + Al + 2Al(CH_3)_3$$
$$3CH_3AlCl_2 + 6Na = 6NaCl + 2Al + Al(CH_3)_3$$

This reaction has the disadvantage that a portion of the aluminum which originally passed into solution by the reaction with methyl chloride is subsequently precipitated again and is thus lost for the production of aluminum trimethyl. Further, this method is limited in its field of use since according to experiments by A. V. Grosse and J. M. Mavity (J. Org. Chem. 5, 116–121 (1940)) the same is not applicable for the production of "propyl aluminum sesquichloride."

If, in this process, aluminum magnesium alloys are used as the starting product in place of the metallic aluminum, it is possible, according to the ratio of the alloy, to obtain aluminum trialkyls or aluminum dialkyl chlorides directly.

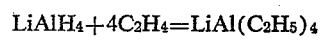

$$Mg_3Al_2 + 6BrC_2H_5 = 3MgBr_2 + 2Al(C_2H_5)_3$$
$$2Al + Mg + 4BrC_2H_5 = MgBr_2 + 2Al(C_2H_5)_2Br$$

These processes are best effected in ether. The use of ether leads to the production of the organic aluminum compounds in the form of the very stable etherates which, for example, as catalysts are less capable of reacting than the ether-free products. The process also fails when attempting to use higher alkyl chlorides and alkyl bromides.

3. From aluminum halides with Grignard compounds which most probably proceeds as follows:

$$AlCl_3 + 3MgClC_2H_5 = Al(C_2H_5)_3 + 3MgCl_2$$

4. By the addition of olefins to aluminum hydride as set forth in U. S. patent application 294,075, June 17, 1952. This, for example, proceeds as follows:

$$AlH_3 + 3C_3H_6 = Al(C_3H_7)_3$$

All these processes have certain technical disadvantages. Process No. 1 requires the use of highly poisonous organic mercury compounds which are only obtainable with difficulty. Processes 2 and 3 require organic halogen compounds and must frequently be effected with the use of valuable organic solvents, as for example, in ethereal solution.

Process 4 has the disadvantage that the aluminum hydride required may only be obtained with great difficulty. In the past, the aluminum hydride has been obtained exclusively from aluminum chloride and lithium hydride in ethereal solution or preferably from lithium-aluminum hydride by reaction with aluminum chloride. In addition, the aluminum hydride is very unstable and upon heating with the olefins a certain quantity is lost before the initiation of the reaction by a decomposition into aluminum and hydrogen.

It is possible to obviate this difficulty by not combining the highly unstable aluminum hydride with the olefins but instead using the substantially more stable lithium-aluminum hydride which is also used for the manufacture of aluminum hydride. This will initially produce the quaternary lithium-aluminum tetraethyl in according with the following:

$$LiAlH_4 + 4C_2H_4 = LiAl(C_2H_5)_4$$

The lithium-aluminum tetraethyl is then reacted with aluminum chloride:

$$3LiAl(C_2H_5)_4 + AlCl_3 = 4Al(C_2H_5)_3$$

This will avoid the troublesome production of aluminum hydride but still necessitates the use of the relatively expensive lithium-aluminum hydride.

One object of this invention is a process for the preparation of organic aluminum compounds which only entails the consumption of aluminum halides or alkyl aluminum sesquihalides; alkali hydrides and olefins. This and still further objects will become apparent from the following description:

The instant invention essentially contains the following features:

A. A quantity of an organic aluminum compound to be produced is used as a starting material. This organic aluminum compound is not consumed during the reaction and may be obtained in accordance with any known process. Once the process of the invention is in operation, the starting organic aluminum compound may be the end product or a portion of the end product of the process. The organic aluminum compound may be in the form of a complex compound with alkali hydrides or alkali alkyls.

B. The starting material consisting of the organic aluminum compound is subjected to a closed cycle of suitably selected reactions in which only olefins, alkali hydrides and readily available aluminum compounds such as aluminum halides or the so-called "alkyl aluminum sesquihalides" are needed as additional reaction components and which constitute the only materials which are consumed in the reaction.

C. At the end of the cycle, the organic aluminum compound initially introduced as the starting material or a compound similar thereto in type, is recovered in a quantity which is increased in relation to the initial starting quantity.

D. The sequence of reactions may be repeated until the increase of the starting material or similar material represents the desired amount to be manufactured. This, as mentioned, may be in the form of the organic aluminum compound or its complex compound with alkali hydrides or alkali alkyls. When this condition is reached, the material which represents the increase over the initial starting product may be recovered, and, if desired, an amount representing the initial quantity may be maintained to reproduce the initial conditions.

The process in accordance with the invention as outlined above will, first of all, be explained in detail with reference to the production of aluminum triethyl for the sake of clarity:

Aluminum triethyl is reacted with aluminum chloride in accordance with Equation 1:

(1) $\quad 2Al(C_2H_5)_3 + AlCl_3 = 3Al(C_2H_5)_2Cl$

The aluminum diethyl chloride formed is reacted with sodium hydride and will form aluminum diethyl hydride. This reaction may be effected in accordance with U. S. patent application Serial No. 347,604 for Production of Alkyl Aluminum Hydrides and Their Complex Compounds With Alkali Hydrides, filed April 8, 1953. The reaction proceeds as follows:

(2) $\quad 3Al(C_2H_5)_2Cl + NaH = 3Al(C_2H_5)_2H$

The aluminum diethyl hydride is then reacted with ethylene (or other olefins) and yields aluminum triethyl (3) (or mixed aluminum diethyl alkylene).

(3) $\quad 3Al(C_2H_5)_2H + 3C_2H_4 = 3Al(C_2H_5)_3$

Therefore, after having started with 2 molecules of aluminum triethyl, there is obtained at the end of the cycle 3 molecules of aluminum triethyl (or of mixed aluminum trialkyl).

The reaction sequence has a theoretical multiplication factor 1.5, and, if the cycle is repeated $n$ times, the theoretical final yield must amount to $(1.5)^n$ times the starting quantity. In practice, this value is not usually completely attained, but when the reaction sequence is repeated twice, there is regularly obtained with comparative certainty a doubling of the initial quantity (instead of 2.25 times).

It is clear that there can thus be obtained very quickly, solely with the consumption of sodium hydride ethylene (olefinic hydrocarbons) and aluminum chloride, large quantities of aluminum triethyl (or aluminum trialkyl). In effect therefore, the following hypothetical molecular reaction occurs:

$$AlCl_3 + 3NaH + 3C_2H_4 = 3NaCl + Al(C_2H_5)_3$$

The process in accordance with invention is generally applicable for preparing organic aluminum compounds having the general formula $AlRR'R''$. In this formula R is a hydrocarbon radical of saturated aliphatic nature with a straight or branched chain. Preferably, R will be a radical of "methyl" up to "dodecyl" of the general formula $C_nH_{2n+1}$, wherein $n$ can represent preferably the numbers from 2 to 12.

R, R', and R'', insofar as hydrocarbon radicals are concerned, may each represent the same radical or different radicals, or two of the same and a third different radical. It is also possible to use mixtures of olefins, as, for example, propylene and butene-(2). With the use of such a mixture of olefins the reaction product consists of a mixture of different aluminum alkyls, which mixture, however, may be used, for example, as a catalyst for a polymerization.

The halogens used may be chlorine, bromine and iodine. A high degree of success was had when chlorides were employed.

The starting olefins, in accordance with the invention, are α-olefins in the form of ethylene, mono-substituted, and 1,1-di-substituted ethylenes, having the general formulas $CH_2=CH_2$, $CH_2=CH-C_nH_{2n+1}$, and $$CH_2 = C \diagdown_{C_nH_{2n+1}}^{C_nH_{2n+1}}$$

in which connection the number of carbon atoms in the hydrocarbon radicals connected to the 1 carbon atom of the ethylene and represented by $n$, may be the same or different in each radical connected to the carbon atom in the di-substituted compounds.

In accordance with the invention, the compound having the general formula set forth above is used as a starting material, and is not consumed in the reaction, and thus, in effect, acts as a promotor. The initial quantity of the starting material having the general formula is reacted in preferred sequence with an aluminum halide or alkyl aluminum halide or alkyl aluminum sesquihalide, an alkyl hydride and an olefin. By means of this reaction, an additional amount of the initial starting material or a material similar in type to the initial starting material, having the general formula, is produced. Thus, in effect, the following hypothetical reaction takes place:

$$AlHal_3 + 3NaH + 3C_nH_{2n} = Al(C_nH_{2n+1})_3 + NaHal$$

in which Hal represents halogen.

For purposes of better understanding the invention, the sequence of the partial reactions have actually been described as a sequence of individual, separate steps of the process, and in actual fact it is possible to carry out the process in this manner. However, it has been found that the separate steps can also be completely or partly combined.

Thus, for example, referring back to the illustration relating to the production of $Al(C_2H_5)_3$, the object is also achieved if, after reaction 1, the dimethyl aluminum chloride is gradually mixed with the quantity of sodium hydride which is equivalent to the chlorine content at 100–120°, while passing through the ethylene. It is also possible alternately or simultaneously to add aluminum chloride and sodium hydride while passing the ethylene into the reaction mixture at 110–120°, if provision is made by suitable steps to prevent the ethylene in the gas chamber from contact in the aluminum chloride as far as possible. There is then observed a continuous increase in the aluminum triethyl, which, however, actually takes place in the course of the reaction cycle which has been described.

Furthermore, it is possible to commence or to cease the reaction sequence represented by (1) to (3) with any one of the three organic aluminum compounds participating therein, and it is readily apparent that in this way it is possible to produce not only aluminum trialkyls, but also aluminum dialkyl monohydrides and monochlorides or aluminum monoalkyl dihydrides and dichlorides or aluminum alkyl hydride halide. It is thus possible to carry out, in effect, all or part of the following five total equations:

$$AlCl_3 + 3NaH + 2C_2H_4 = Al(C_2H_5)_2H + 3NaCl$$
$$AlCl_3 + 2NaH + 2C_2H_4 = Al(C_2H_5)_2Cl + 2NaCl$$
$$AlCl_3 + 3NaH + 1C_2H_4 = AlC_2H_5H_2 + 3NaCl$$
$$AlCl_3 + 1NaH + 1C_2H_4 = AlC_2H_5Cl_2 + 1NaCl$$
$$AlCl_3 + 2NaH + 1C_2H_4 = AlC_2H_5HCl + 2NaCl$$

Completely analogous reactions are obtained if "alkyl aluminum sesquihalides" (or their components of the type $RAlCl_2$ or $R_2AlCl$), such as are obtained from halogen alkyls and aluminum, are used instead of the aluminum halides for the introduction of aluminum. The process according to the invention then renders it possible for halogen atoms of these halogen compounds to be replaced by alkyls without a loss of material occurring due to aluminum being precipitated, such as occurs in the treatment with sodium metal. The following reaction sequence has the multiplication factor 2:

$$Al(C_2H_5)_3 + AlC_2H_5Cl_2 = 2Al(C_2H_5)_2Cl$$
$$2Al(C_2H_5)_2Cl + 2NaH = 2NaCl + 2Al(C_2H_5)_2H$$
$$2Al(C_2H_5)_2H + 2C_2H_4 = 2Al(C_2H_5)_3$$

Sum: $\quad AlC_2H_5Cl_2 + 2NaH + 2C_2H_4 = Al(C_2H_5)_3 + 2NaCl$

If this equation is multiplied three times, there is obtained the equation:

$$3AlC_2H_5Cl_2 + 6NaH + 6C_2H_4 = 3Al(C_2H_5)_3 + 6NaCl$$

In this equation the aluminum ethyl dichloride can be a mixture of aluminum chloride and aluminum trialkyl in accordance with the following equation:

$$3AlC_2H_5Cl_2 = 2AlCl_3 + Al(C_2H_5)_3$$

If the mixture of aluminum chloride and aluminum trialkyl is inserted in the triplicated summation equation in place of the aluminum ethyl dichloride, there is obtained the following equation:

$$2AlCl_3 + 6NaH + 6C_2H_4 = 2Al(C_2H_5)_3 + 6NaCl$$

It is thus shown that also when using aluminum ethyl dichloride, the same hypothetical reaction is obtained as was indicated on column 3, line 43.

If "sesquichloride" is initially employed, then, for each molecule $AlCl_2C_2H_5$ there is also introduced into the mixture one molecule $Al(C_2H_5)_2Cl$, which finally supplies an additional molecule $Al(C_2H_5)_3$, whereby the multiplication factor rises to 3.

It may, however, also be of advantage to convert the portion of the dialkyl aluminum halide in the "sesquihalide" into alkyl aluminum dihalide by mixing with aluminum halide in accordance with the equation:

$$Al(C_2H_5)_2Cl + AlCl_3 = 2Al(C_2H_5)Cl_2$$

The "multiplication factor" of the reaction sequence is then again only two, but for this purpose aluminum halide is also incorporated in the reaction in addition to the "sesquihalide." These reaction sequences are again also capable of being combined into one operation in the manner already indicated above. Therefore, from the point of view of the hypothetical conversion, the sesquichloride, or generally the "sesquihalides," can be considered to be mixtures of aluminum halides and aluminum alkyls.

Aluminum trialkyls and aluminum dialkyl hydrides are capable of adding alkali hydrides to form complex compounds such as $$[HAlR_3]Na[H_2AlR_2]Li$$

and others. These compounds are frequently characterized by good solubility in suitable organic solvents which are inert in relation thereto.

As solvents there may be taken all materials inert to the compounds used during the process. They are in the main hydrocarbons of any kind, ethers and cyclic ethers including tetra-hydrofurane, dioxane and others and certain tertiary amines such as dimethyl aniline or diethyl aniline. It is also possible to effect the reaction in the absence of solvents. Without the use of solvents, however, the reaction mixtures may become too thick to be readily worked up, since during the reaction, a relatively large quantity of inorganic salts, such as sodium chloride, lithium chloride, sodium bromide, etc., deposits out. It is therefore preferable to use solvents and it is often necessary to use the same. It is, however, not necessary to use more solvents than are required for attaining the main purpose, i. e. to transfer the reaction substances into a state capable of being easily stirred and filtered. Generally, five to ten times the volume of solvent, based on volume of the total amount of aluminum compounds present, will do.

Since the alkali hydrides themselves are completely insoluble, their reaction with the alkyl aluminum halides proceeds slowly in many cases, as the particles of alkali hydride will become coated with the alkali halide, whereby their further reaction is prevented. Consequently, it may frequently be advisable to introduce the alkali hydrides into the reaction cycles in such manner that such complex compounds can first of all be formed, for example, in the following manner:

(a) $2(C_nH_{2n-1})_3Al + 2NaH = [2H(C_nH_{2n+1})_3Al]Na$
(b) $2[H(C_nH_{2n+1})_3Al]Na + Al(C_nH_{2n+1})Cl_2$
    $= (C_nH_{2n+1})_3Al + 2HAl(C_nH_{2n+1})_2$
(c) $(C_nH_{2n+1})_3Al + 2HAl(C_nH_{2n+1})_2 + 2C_nH_{2n}$
    $= 3(C_nH_{2n+1})_3Al$ (Multiplication factor 1.5).

With this method of working, in the phase (b), exclusively soluble substances enter into reaction with precipitation of insoluble alkali halide. This process (explained with reference to the example of the production of aluminum tripropyl) can be developed into a fully continuous process if the procedure according to the following diagram is followed:

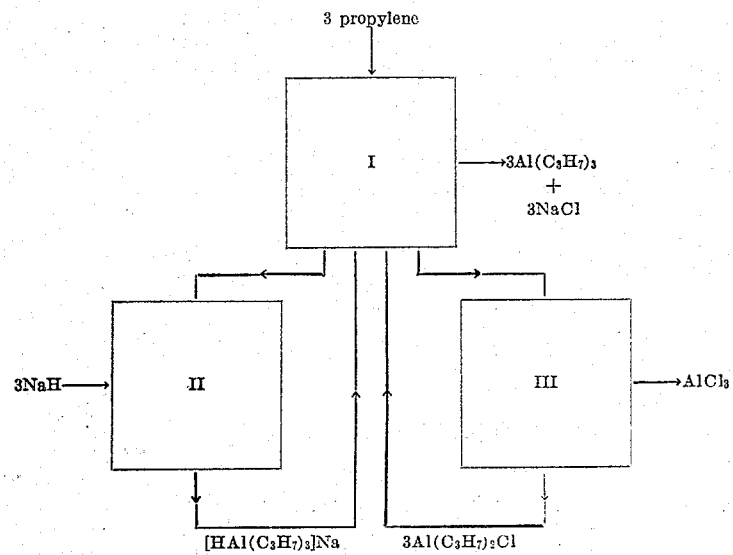

From a container I with prepared aluminum tripropyl in a suitable solvent, for example, octane, two component flows are conducted by pumps into the containers II and III and from the latter back to the container I again. In container I a temperature of 120° is maintained and propylene is continuously forced in (preferably at a few atmospheres absolute pressure). It is also possible in this case for the propylene to be circulated by pumping and only the absorbed propylene constantly replaced. In containers II and III alkali hydride and aluminum halide, respectively, are introduced in the ratio 3:1, so that the liquid reflux flowing from II to I contains alkali tripropyl aluminum hydride, and, accordingly, dipropyl aluminum chloride flows back from III to I. In container I there takes place the conversion of the alkali compound and of the chloride and the addition of the propylene, so that with suitable adjustment of the component flows into I, a solution of practically only aluminum tripropyl is available, which is constantly increased and from which it is possible constantly to extract a component flow together with the very finely divided precipitated sodium chloride. Alkali hydride and aluminum chloride are expediently supplied in the form of good-flowing, finely-ground, uniform suspensions in the solvent also used in I. The concentrations are so adjusted that also the common salt which is constantly formed can be moved satisfactorily.

In the new process as set forth above, a partial process was always the addition of olefins to compounds of the type $HAlR_2$ or $H_2AlR$. According to the invention this addition is also possible with the complex alkali hydride compounds of the aluminum dialkyl hydrides or with the complex compounds. It is thus possible to combine the following partial processes with one another:

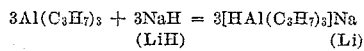
(LiH)       (Li)
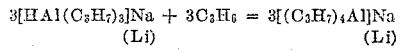
(Li)        (Li)
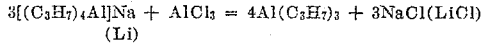
(Li)

in the case of the total reaction $$AlCl_3 + 3C_3H_6 + 3NaH = 3NaCl + Al(C_3H_7)_3$$

which has just been described.

The first and second stages are also capable of being combined by heating together sodium hydride, aluminum tripropyl and propylene in octane, cyclohexane or the like under pressure to 160–180°. The multiplication factor of this cycle is 1.33.

In the process according to the invention, it is readily possible with particular advantage to use sodium hydride, which is the cheapest alkali hydride, as one reaction component. The conversions carried out then appear insofar as they have aluminum trialkyls or their complex compounds as final products, as virtual accomplishments or indirect realizations of reactions such as $$AlCl_3 + 3NaH = AlH_3 + 3NaCl$$
$$AlH_3 + 3C_nH_{2n} = Al(C_nH_{2n+1})_3$$

or

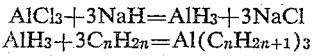
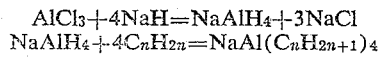

which are not adapted to be directly carried out, since hitherto neither aluminum hydride nor sodium aluminum hydride could be obtained in the manner indicated.

Although the use of sodium hydride is preferable for purely economic reasons, other alkali come within the scope of the present invention.

Although the processes $$AlCl_3 + 3LiH = AlH_3$$

and

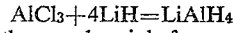

are known, and thus, as hereinbefore explained, the subsequent conversion of $AlH_3$ or $LiAlH_4$ into lithium-aluminum compounds or aluminum compounds by means of olefins presents no difficulties, the use of lithium hydride during the combination process according to the present invention can nevertheless be advantageous, since it saves in each case the roundabout course by way of lithium aluminum hydride and obviates the use of sensitive aluminum hydride. As compared with the use of sodium hydride, the introduction of lithium hydride into separate phases of the combinations of the process according to the invention even offers many outstanding advantages (if the difference in price is disregarded), since lithium hydride is more easily brought into reaction than sodium hydride and also the complex organic lithium-aluminum compounds perhaps occurring as additional intermediate products are distinguished as compared to the sodium compounds by better solubility and higher reacting capacity.

For purposes of better understanding, the description of the present invention has previously been limited to such cases in which compounds of the type $R_2AlH$ or $[R_3AlH]$ Na or Li were introduced into the reaction cycles. However, there may equally well occur in the new process compounds of the type $RAlH_2$, $[R_2AlH_2]$ Na or Li or K. Processes of the type are $$(C_nH_{2n+1})_2AlH + LiH = [H_2(C_nH_{2n+1})_2Al]Li$$
$$[H_2(C_nH_{2n+1})_2Al]Li + 2C_nH_{2n} = [(C_nH_{2n+1})_4Al]Li$$
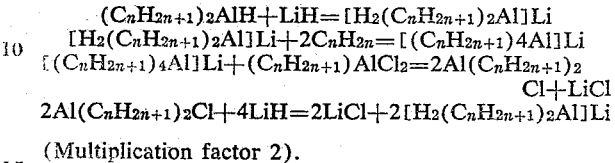

$$2Al(C_nH_{2n+1})_2Cl + 4LiH = 2LiCl + 2[H_2(C_nH_{2n+1})_2Al]Li$$

(Multiplication factor 2).

$$(C_nH_{2n+1})_3Al + 2AlCl_3 = 3Al(C_nH_{2n+1})Cl_2$$
$$3Al(C_nH_{2n+1})Cl_2 + 3LiH = 3Al(C_nH_{2n+1})H_2$$
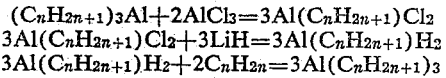

(Multiplication factor 3).

Compounds of the type $Al(C_nH_{2n+1})H_2$ are, however, relatively unstable, so that the multiplication factor which is particularly favorable in this combination is not capable of always being effectively utilized with advantage.

Those embodiments of the process according to the invention which have been reproduced in this description of the invention by reaction equations are in no way an exhaustive record of all those reaction cycles which, by exclusive use of alkali hydrides, olefins and aluminum compounds such as $AlCl_3$ or "alkyl aluminum sesquihalides," permit of an increase of the organic aluminum compounds introduced as auxiliaries at the commencement of the process. An enumeration of all such embodiments of the present invention is not necessary, since the same will become apparent to the artisan. The essence of the invention lies in the general teaching that such reaction sequences or reaction cycles can be employed with advantage for the production of organic aluminum compounds (including their complex compounds with alkali alkyls or alkali hydrides) and it is a simple matter to a person skilled in the art to formulate additionally such combinations of suitable individual reactions after his attention has first been drawn thereto by the present invention.

The following examples are given to illustrate the invention and not to limit the same:

*Example 1*

In a pressure vessel provided with a stirring mechanism and filled with nitrogen, 156 g. (1 mol) aluminum tripropyl are dissolved in 100 cc. of dry hexane and mixed with 24 g. of sodium hydride in the form of a fine suspension in hexane (the suspension being produced by wet grinding in a ball mill) and is heated for some time to 70° in the closed vessel while stirring. A suspension (likewise produced by wet grinding in a ball mill) of 33.4 g. aluminum chloride in 500 cc. hexane is added drop by drop within one hour and heating is carried out for 2 hours to 60–70°. A sample of the solution taken at this point and clarified by centrifuging in a nitrogen atmosphere, no longer contains any dissolved halogen, but still contains a little alkali. The operation is repeated with 8 g. sodium hydride in 30 cc. hexane and 11 g. aluminum chloride in 170 cc. hexane and 4 g. sodium hydride and 5 g. aluminum chloride. The mixture is then heated for a further 2 hours to 70° and samples which are drawn off are then analyzed. It contains in the total volume 2.2 g. of dissolved sodium hydride, which are further reacted by addition of a further 4 g. aluminum chloride and subsequent heating. The solution is now free of chlorine and alkali.

120–130 g. propylene are then forced into the autoclave and this is heated for 1–2 hours under pressure to 80–90°. Thereafter, the excess propylene (which can be condensed again) is distilled off at 55°.

In a further similar cycle, altogether 51 g. sodium hydride, 100 g. aluminum chloride and propylene (in excess)

are reacted, and thereafter, once again, 80 g. sodium hydride, 148 g. aluminum chloride and propylene (in excess) are reacted. The total volume at this time is 4 liters.

If the operation is now terminated, there are obtained 400 g. aluminum tripropyl, which corresponds to an actual "multiplication factor" for the individual process of 1.37 instead of 1.50.

The completion of the operation may, for example, be carried out in the following manner. The solution is centrifuged in nitrogen atmosphere, the clear solution is decanted in nitrogen atmosphere, and the sediment in the centrifuge is washed out with hexane in nitrogen atmosphere. The solvent is then driven off in nitrogen atmosphere and the residue is distilled in vacuo. Boiling point 75–80° with a pressure of 1 mm.

*Example 2*

50 g. aluminum tri-isobutyl etherate are dissolved in 150 cc. of air-free ether in nitrogen and mixed with 53 g. aluminum chloride in 200 cc. of ether. Instead of that, there can also be used as the initial product a solution of 103 g. of isobutyl aluminum dichloride in 200 cc. ether. Two-thirds of the solution obtained is allowed to flow together with a fine suspension of 10 g. lithium hydride stirred in $N_2$, whereupon there is rapidly formed a solution of lithium aluminum isobutyl trihydride $Li(AlH_3C_4H_9)$

which can be recognized by the fact that the ethereal solution previously clarified by settling now contains in dissolved form the correct quantity of alkali. If the lithium chloride is now separated off by centrifuging (in closed centrifuging vessels filled with nitrogen), there is obtained a clear solution which is now mixed with that third of the isobutyl aluminum dichloride solution initially held back. Thereafter, two-thirds of the ether used for solution are vaporized, mixed with 120 g. isobutylene and heated in the autoclave for 6 hours to 70–80°. The isobutylene is then distilled off and then the amount of aluminum tri-isobutyl present is ascertained by means of an aluminum determination in the residue. 130–140 g. are found. Proportions of the above-mentioned substances are further added in relation to this quantity, and 350–400 g. of aluminum tri-isobutyl etherate are obtained after the first repetition of the reaction sequence, and approximately 1 kg. thereof after a further repetition.

It is also possible to stop the reaction cycle after $C_4H_9AlCl_2$ is formed, but in this case finally aluminum chloride must be added.

*Example 3*

114 g. (1 mol) aluminum triethyl are mixed with 247.5 g. "ethyl aluminum sesquichloride" (produced from aluminum and ethyl chloride) and thus converted into 3 mol aluminum diethyl chloride. 1 additionl mol of aluminum diethyl chloride is dissolved in 1 liter of hexane and, in a stirrer-type autoclave of dimensions corresponding to the planned development of the experiment, is converted in a nitrogen atmosphere into a solution of sodium aluminum triethyl hydride with the equivalent quantity of sodium hydride, while heating to 100–110°. The pressure is then raised to 15 atm. ethylene and ⅓ of the previously prepared aluminum diethyl chloride is forced in by means of a pump, while stirring the contents of the autoclave. The rapidly falling ethylene pressure is kept approximately constant by recompressing ethylene until no more ethylene is taken up, and then 2 mol sodium hydride is introduced under pressure into the autoclave in a volume of hexane corresponding to the increased quantity of substance. Thereafter, the remainder of the aluminum diethyl chloride is added and is saturated in the manner described with ethylene. The autoclave now contains 4 mol aluminum triethyl. Half of the contents is drawn off, care being taken by stirring that the sodium chloride which is formed is uniformly discharged in relation to the volume and this proportion is supplied for the final working. A further quarter of the contents is again drawn off and mixed with 247.5 g. of ethyl aluminum sesquichloride. The residual quarter remaining in the autoclave serves for dissolving the sodium hydride in the next experiment.

For best possible utilization of the pressure vessels which are available, it is expedient so to plan the experiment that the vessel is just filled to the maximum at the end of such a reaction sequence. Under these conditions, it is possible with prescribed quatity of aluminum triethyl just to produce a quantity of fresh aluminum triethyl which is equal to it. If insufficient aluminum triethyl is available for the first experiment, there should be initially employed a smaller autoclave in which there is produced, by a plurality of such operations carried out in succession, as much aluminum triethyl as corresponds to half the contents of the final, large experimental vessel—taking into consideration dilution by the solvent.

The finishing of the reaction solutions which are obtained is very simple: the solutions are filtered (or centrifuged) in an $N_2$ atmosphere, the hexane is distilled off and the residue of $Al(C_2H_5)_3$ is rectified in vacuo.

Instead of the "ethyl aluminum sesquichloride" mentioned in this example, it is possible to use aluminum chloride with suitable modification of the quantity ratios.

*Example 4*

The procedure is as in Example 3, but the main reaction vessel (which in this case does not have to be particularly pressure-tight) contains 86 g. aluminum diethyl hydride (in 500 cc. of octane), and this aluminum diethyl hydride is converted with 24 g. of sodium hydride into 1 mol sodium aluminum diethyl hydride ($Na[AlH_2(C_2H_5)_2]$), while 1 mol aluminum triethyl is reacted with 247 g. of "sesquichloride" externally of the reaction vessel, as in Example 3. ⅓ of the "monochloride" which is formed is introduced into the main reaction vessel. The latter now contains 2 mols aluminum diethyl chloride. Thereafter, an additional 2 mols of sodium hydride is added, heating is carried out in the presence of sufficient octane (2–3 liters) to 100–110°, and the remainder of the aluminum diethyl chloride is added drop by drop while stirring.

The reaction vessel now contains 4 mols aluminum diethyl hydride in 2–3 liters of octane. One quarter thereof is extracted (in $N_2$ atmosphere) and this proportion is treated in an autoclave at 60–70° for 1 hour with 5–10 atm. ethylene. In this way, there is recovered the quantity of aluminum triethyl which is necessary for the start of the next reaction sequence. It is not necessary to liberate this from the octane. A further 2/4 of the reaction mixture enter into the process. ¼ is left in the vessel for the commencement of the next operation. In this manner, it is possible easily to produce any desired quantities of aluminum diethyl hydride.

In the processes according to Examples 3 and 4, attention is to be paid to the following: In the description of the examples, the optimum course of the reaction has been assumed. In actual fact, the yields are not 100%, but are usually somewhat lower, owing to unavoidable losses, caused by spontaneous decomposition with separation of metallic aluminum. It is therefore not possible accurately to describe the processes in a quantitative respect, since their results vary somewhat. If it is desired to start each cycle with the original amount of organic aluminum compound, it is necessary to ascertain at the end of the reaction sequences, by analytical testing of samples of the reaction mixtures, how much of the required final product is actually present and to keep the amounts drawn off from the preparation correspondingly smaller, so that exactly the original quantities are available again for the commencement of the next cycle.

Example 5

110 g. aluminum tri-dodecyl with a 25 percent etherate part (prepared by two hours' heating of 10 g. solid aluminum hydride with an ether content of 40 percent with 150 cc. of α-dodecene up to 80° C. and distilling off the excess dodecene in high vacuo at 80° C.) are dissolved in 150 cc. of dry air-free ether and mixed with a solution of 55 g. AlCl₃ in 200 cc. of ether. In a nitrogen atmosphere, two-thirds of the solution obtained are allowed to flow together with a fine suspension of 10 g. lithium hydride in ether, so that the ether will slowly boil. After dying away of the spontaneous heating, the solution is heated again for 1 hour up to boiling. Thereafter, the last third of the dichloride solution is added and the eliminated lithium chloride is now separated off by centrifuging (in closed centrifuging vessels filled with nitrogen). There is obtained a clear solution. To this solution there are added 300 cc. of α-dodecene, and the ether is then distilled off until a mercury thermometer dipped in shows a temperature of 80° C. This temperature is maintained for 3 hours, after which the remaining ether and the excess dodecene are distilled off in high vacuo at 80° C. 280–300 g. of aluminum tri-dodecyl etherate are so obtained in form of a viscous residue.

By repetition of these reaction sequences, there can easily be obtained any amounts of aluminum tri-dodecyl.

Example 6

113 g. of methyl aluminum sesquibromide, which can easily be obtained in any amount from aluminum metal and methyl bromide, are mixed with 24 g. of aluminum trimethyl (in a nitrogen atmosphere) into 137 g. of dimethyl aluminum monobromide. On the other hand, a greater amount of methyl aluminum dibromide is produced from the same sesquibromide by admixing aluminum bromide (89 g. AlBr₃ for every 113 g. sesquibromide). The 137 g. dimethyl aluminum monobromide are now dissolved in 700 cc. of dry benzene and are slowly reacted at a temperature of about 70–80° C. with 24 g. of sodium hydride, suspended in 100 cc. of benzene. The benzene will boil and the addition of sodium hydride is so regulated that the reaction will not become too violent. Finally, the boiling is effected until the benzene solution which was previously clarified will after decomposition of a sample with water give no or only a very weak reaction with silver nitrate. The solution is introduced into a pressure vessel, air being excluded, and a technical pentene-(1)/pentene-(2) mixture is added preferably containing a sufficient quantity of pentene-(1), as, for example, 20–50% of pentene-(1). Such a proportion of this pentene mixture should be used that finally about 100 g. (theoretically necessary amount 70 g.) of pentene-(1) are contained in the pressure vessel. The mixture is then heated for two hours to 100° C., and then the unreacted pentene-(2) and the excess pentene-(1) are withdrawn from the autoclave through a valve. The last residues of the C₅-hydrocarbons are now driven off together with a small amount of benzene at atmospheric pressure and while using a column.

The obtained solution of about 1 mol dimethyl aluminum pentyl in benzene containing still 103 g. sodium bromide suspended is then reacted with 202 g. of the methyl aluminum dibromide already prepared. Within the solution, there are formed side by side the compounds

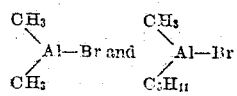

in a total amount of 2 mols. The solution is diluted with 500 cc. dry benzene, and the above operations are repeated, the amounts of sodium hydride and pentene, however, being doubled. This reaction phase results in a benzenic solution of a mixture of

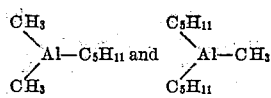

When this experiment is continued with increasingly larger amounts of methyl aluminum dibromide, sodium hydride and pentene, the relative amount of the methyls bound to aluminum will always diminish after treatment with pentene, while the amount of pentyls increases, until there finally results a ratio of methyl: pentyl =1:2, i. e., until the aluminum trialkyl formed has the average composition of the compound $CH_3Al(C_5H_{11})_2$. In fact, however, there is present a mixture of a large amount of this mixed aluminum trialkyl with small amounts of $(CH_3)_3Al$, $(CH_3)_2AlC_5H_{11}$ and $Al(C_5H_{11})_3$. This will become evident in case such an experiment is finally stopped after several repetitions of the above reaction cycles, and the aluminum compounds are separated from sodium bromide by filtration (while afterwashing with benzene) under exclusion of air and then distilled. The aluminum trialkyl will then boil inconstantly from about 35° C. (10 mm.) to about 130° C. (0.01 mm.), the mixture of all fractions, however, having a content of 14 to 15% aluminum (theoretically 14.6% Al for $CH_3Al(C_5H_{11})_2$).

The same experiment can also be employed with a small modification for the preparation of a dialkyl aluminum bromide of the average composition of a compound

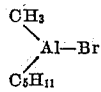

The experiment, after several repetitions of the above reaction cycle, has only to be stopped after there has just been added a (last) portion of the methyl aluminum dibromide. In this case, the reaction product will boil at 110° C. (1 mm.).

The experiment as described here can also be made in quite a similar manner with a technical mixture of α-olefines of about C₅–C₇ or with mixtures of these α-olefines with paraffins. Mixtures of such a kind can, for instance, easily be obtained by distillation of cracked benzines. In such a case, the average molecular weight of the olefine is evaluated by bromine titration, while the proportion of α-olefine is perhaps evaluated by means of the infra-red spectrum. Moreover, in the above example there is taken instead of pentene the amount of the cracked benzine equivalent to the pentene. The reaction products are mixtures of aluminum trialkyls with rather large boiling ranges (commence at about 50° C./10 mm., end at 130° C. in absolute vacuo), these mixtures, however, being fully effective for instance as catalysts.

We claim:

1. Process for the preparation of organic aluminum compounds selected from the group consisting of compounds having the general formula: AlRR′R″, in which R is a saturated aliphatic hydrocarbon radical, R′ is a member selected from the group consisting of saturated aliphatic hydrocarbon radicals, hydrogen, and halogen, and R″ is a member selected from said last-mentioned group, complex compounds thereof with alkali hydrides and complex compounds thereof with alkali alkyls which comprises: reacting in a reaction cycle an organic aluminum compound selected from said group with (a) a member selected from the group consisting of aluminum halides, alkyl aluminum halides, and alkyl aluminum sesquihalides; (b) an alkali hydride; and (c) an olefin having a terminal double bond; and recovering an additional quantity of an organic aluminum compound selected from said group, whereby, in effect, (a), (b), and (c) have yielded an organic aluminum compound selected from said group.

2. Process according to claim 1, in which the starting organic aluminum compound is in the form of a complex compound with an alkali hydride.

3. Process according to claim 1, in which said organic aluminum compound is reacted with (a), (b), and (c) in sequence.

4. Process according to claim 1, in which at least two of the partial reactions in the reaction cycle are jointly effected.

5. Process according to claim 4, in which said starting organic aluminum compound is reacted with (a) to form an alkyl aluminum halide, and in which said alkyl aluminum halide is treated at a temperature of about 100–120° C. with a quantity of (b) corresponding to the halogen content while passing through (c).

6. Process according to claim 1, in which (a) and (b) are alternately introduced at a temperature of 110–120° C. into said organic aluminum compound while substantially continuously passing (c) into the reaction mixture, and maintaining (c) substantially free from contact with (a).

7. Process according to claim 1, in which the starting organic aluminum compound is a member selected from the group consisting of aluminum trialkyls and aluminum alkyl hydrides, and in which (b) is first reacted with said organic aluminum compound to form a complex compound therewith.

8. Process according to claim 1, which includes establishing a first reaction zone, a second reaction zone, and a third reaction zone, maintaining said organic aluminum compound in said first reaction zone, substantially continuously passing (c) into said first reaction zone, substantially continuously passing (b) into said second reaction zone, and substantially continuously passing (a) into said third reaction zone, substantially continuously passing a component flow of reactants from said first reaction zone to said second and third reaction zones, respectively, substantially continuously passing reactants from said second and third reaction zones back to said first reaction zone, and recovering said organic aluminum compound from said first reaction zone.

9. Process according to claim 8, in which (a), (b), and (c) are continuously passed in the ratios of 1:3:3, respectively.

10. Process according to claim 9, in which said first reaction zone is maintained at a temperature of about 110–120° C.

11. Process according to claim 1, in which in said general formula R is a saturated alkyl hydrocarbon radical.

12. Process according to claim 1, in which said starting organic aluminum compound is an aluminum trialkyl.

13. Process according to claim 1, in which (a) is an alkyl aluminum chloride.

14. Process according to claim 1, in which (c) is ethylene.

15. Process according to claim 1, in which (b) is sodium hydride.

16. Process according to claim 1, in which the starting organic aluminum compound is in the form of a complex compound with an alkali alkyl.

References Cited in the file of this patent
UNITED STATES PATENTS 2,388,428     Mavity _____ Nov. 6, 1945

OTHER REFERENCES

Grosse et al.: Journal Org. Chem., vol. 5, 1940, pages 106 to 121.